(12) United States Patent
    Ehbets

(10) Patent No.: US 12,560,533 B2
(45) Date of Patent: Feb. 24, 2026

(54) OPTICAL SYSTEM COMPRISING ANS OPTICAL MULTIPLEXER

(71) Applicant: X-RITE EUROPE GMBH, Regensdorf (CH)

(72) Inventor: Peter Ehbets, Regensdorf (CH)

(73) Assignee: X-RITE EUROPE GMBH, Regensdorf (CH)

( * ) Notice: Subject to any disclaimer, the term of this patent is extended or adjusted under 35 U.S.C. 154(b) by 143 days.

(21) Appl. No.: 18/271,198

(22) PCT Filed: Jan. 7, 2022

(86) PCT No.: PCT/IB2022/050110
    § 371 (c)(1),
    (2) Date: Jul. 6, 2023

(87) PCT Pub. No.: WO2022/149093
    PCT Pub. Date: Jul. 14, 2022

(65) Prior Publication Data
    US 2024/0053259 A1     Feb. 15, 2024

(30) Foreign Application Priority Data
    Jan. 7, 2021     (EP) .................................... 21150561

(51) Int. Cl.
    *G01N 21/31*          (2006.01)
    *G02B 17/08*          (2006.01)
(52) U.S. Cl.
    CPC ......... *G01N 21/31* (2013.01); *G02B 17/0896* (2013.01); *G01N 2201/0636* (2013.01)
(58) Field of Classification Search
    CPC ............................ G02B 17/0896; G01N 21/31
    See application file for complete search history.

(56) References Cited

U.S. PATENT DOCUMENTS

| | | |
|---|---|---|
| 9,772,230 B2 | 9/2017 | Ehbets et al. |
| 2018/0307053 A1 | 10/2018 | Zywicki |

FOREIGN PATENT DOCUMENTS

| | | | |
|---|---|---|---|
| CN | 106094080 | 11/2016 | |
| WO | WO-2011140030 A2 * | 11/2011 | ........... A61B 5/0059 |

OTHER PUBLICATIONS

One Class, "The is a plane perpendicular to the optic axis through the focal point", https://www.youtube.com/watch?v=k7fzOTjLXHA, Dec. 2, 2020 (Year: 2020).*
International Search Report regarding PCT/IS2022/050110, dated Feb. 28, 2022, (3 pgs.).
Written Opinion of the International Searching Authority egarding PCT/IB2022/050110, dated Feb. 28, 2022, (7 pgs.).

* cited by examiner

*Primary Examiner* — Maurice C Smith
(74) *Attorney, Agent, or Firm* — Hahn Loeser & Parks LLP

(57)     ABSTRACT

An optical system (230) comprises an image sensor (231), a reference sensor (232), and an optical multiplexer (300). The optical multiplexer defines a first area for receiving a first portion of incoming light and a second area (320) for receiving a second portion of the incoming light. The second area radially surrounds the first area. The optical multiplexer is arranged to direct the first portion of the incoming light to the image sensor (231) and the second portion of the incoming light to the reference sensor (232). The optical multiplexer may take the form of a pinhole minor (300).

20 Claims, 5 Drawing Sheets

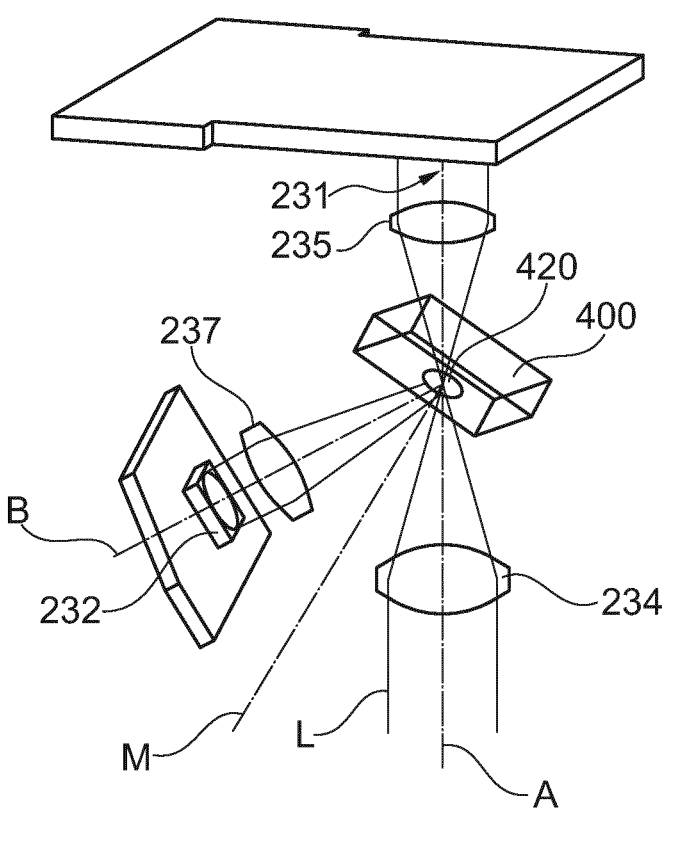
Fig. 6
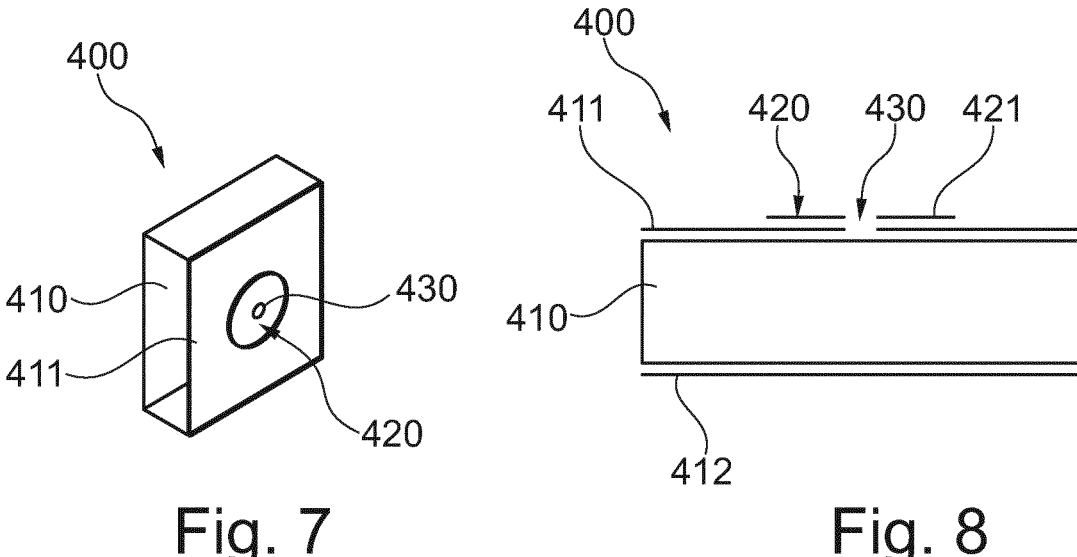
Fig. 7                    Fig. 8

(a)
(b)
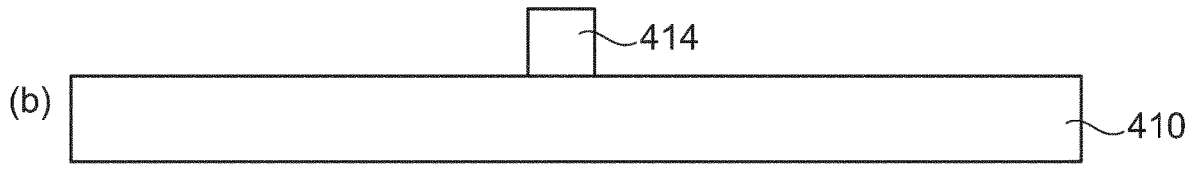
(c)
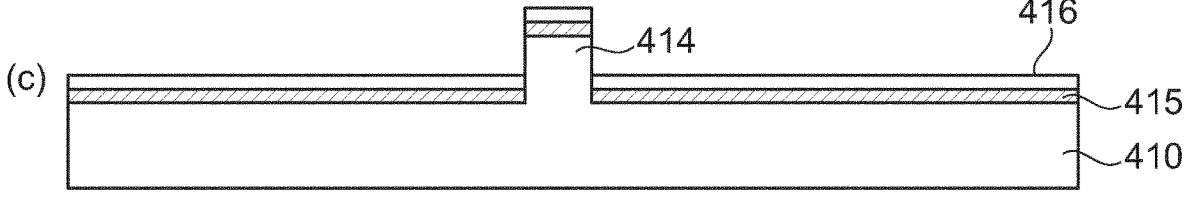
(d)
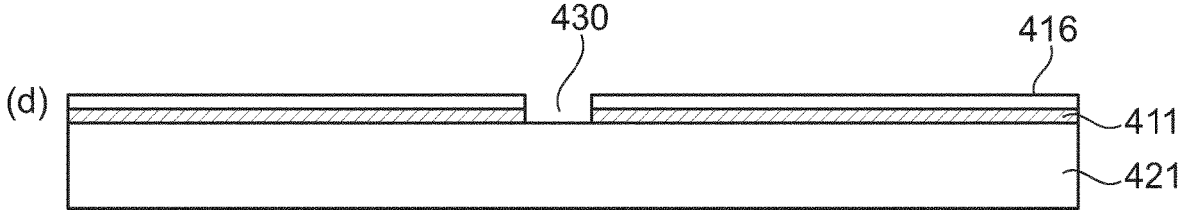
Fig. 9
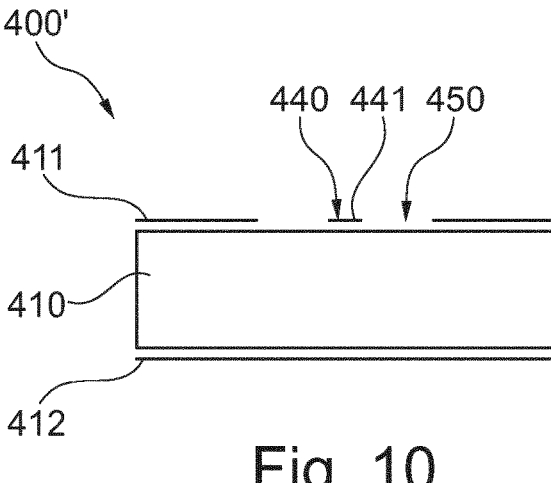
Fig. 10

OPTICAL SYSTEM COMPRISING ANS OPTICAL MULTIPLEXER

The present application is a National Stage Entry of International Patent Application Number PCT/IB2022/050110, filed Jan. 7, 2022, which claims priority from European Patent Application number 21150561.5, filed Jan. 7, 2021.

TECHNICAL FIELD

The present invention relates to an optical system comprising an optical multiplexer, to a measurement device that comprises such an optical system, and to an optical multiplexer for use in an optical system.

PRIOR ART

The visual impression of an actual material or object in an environment under defined illumination and viewing conditions is referred to in the relevant specialist circles as "appearance". Appearance is known to be the result of a complex interaction of different factors:

geometrical factors, which define the scene, the object and the illumination and viewing conditions;

optical properties, which describe the interaction between light and the material of the viewed object; and physiological factors, which influence the perception (response) of the human visual system.

In many industrial applications, it is desired to carry out measurements for characterizing the appearance of a material or object. In such measurements, a plurality of optical properties of the material or object are determined under one or more sets of illumination and viewing conditions. A large variety of instruments have been proposed for this purpose, with varying degrees of complexity.

One example is the repair of automobiles. When a damaged automobile part is to be replaced by a new part in a bodyshop, the new part needs to be coated with a paint such that its visual appearance exactly matches the visual appearance of the original part. The same is true if a damaged part needs to be repainted. To this end, it is desirable to determine the visual appearance of the original part by measurements and to define, based on the measurements, a paint recipe that will achieve a close match to the appearance of the original part.

Automobile paints often comprise effect pigments that cause gonioapparent behavior, i.e., they cause an appearance that strongly depends on the illumination and viewing directions. For instance, special effect flake pigments may cause a sparkle effect under specular illumination. As another example, interference pigments may cause goniochromism, i.e., a gradual change of color as the illumination or viewing direction changes. Effect pigments are also used in other materials, for instance, in plastic materials of many household articles.

Various industrial standards each propose suitable sets of measurement geometries for characterizing materials that comprise effect pigments. ASTM E2194-14 (2017) defines a set of at least three measurement geometries for materials that comprise metallic effect pigments. ASTM E2539-14 (2017) defines additional measurement geometries for characterizing materials that comprise interference pigments.

Effect pigments may produce not only gonioapparent color, but also local variations in the surface of the viewed object, which are called "texture". Two aspects of texture can be distinguished: visual texture characterizes spatial variation of color and reflectance, while surface texture characterizes the three-dimensional topography of a surface on a scale which the human eye can resolve. Visual texture is generally different under specular illumination, such as for example direct sunlight, and diffuse illumination, such as for example overcast skies. Specular illumination may produce a pattern of very bright visible point light sources which are caused by direct reflections of the pigment flakes on the uppermost layer of paint. This effect is usually referred to as sparkle, glint, glitter or micro-brilliance. Diffuse illumination produces a local variation in brightness with much lower contrast, which is usually referred to as graininess, diffuse coarseness, image grain or granularity.

From the prior art, handheld devices that combine multi-angle color measurements with texture measurements are known. One such known instrument is the BYK-mac i, available from BYK Gardner, Geretsried, Germany. The BYK-mac i is a multi-angle instrument with two separate measurement systems for color measurements and for camera-based texture measurements. For carrying out multi-angle color measurements, a single illumination module is provided at an anormal angle (i.e., at an angle relative to the surface normal of the sample surface) of 45°, the illumination module comprising a set of multiple monochromatic light sources which are sequentially switched on for the measurement. Detection is carried out by six individual detector channels arranged at standardized aspecular angles, each detector channel comprising a single photodiode. The system includes an additional multi-spectral detection system for determining the presence of fluorescence and for correcting the spectral measurement results. A camera is arranged at an anormal angle of 0° and comprises a monochromatic image sensor. The camera is combined with a color detector channel. Three additional directional broadband light sources and one diffuse broadband light source are provided for the texture measurements. The directional broadband light sources are used to generate sparkle images from which the sparkle scale values are computed. The diffuse broadband light source is used to generate image data for the calculation of graininess or coarseness parameters. The device is operated sequentially, with separate cycles for color measurement and for image-based texture measurement.

Another example is the MA-Tx series of instruments available from X-Rite, Inc., Grand Rapids, MI, USA, which includes the models MA-T6 and MA-T12. These instruments are handheld multi-angle spectrophotometers that include a digital color camera for imaging the sample surface. The system architecture of the MA-Tx series is described in U.S. Pat. No. 9,772,230 B2. The instruments include a mechanical arc structure with up to 7 illumination systems at different angles and two detector systems at anormal angles of 15° and 45°. In addition two diffuse illuminators are provided at a location outside of the arc structure. The detector system at the anormal angle of 45° is realized as a spectral pick-up system which couples the collected light into a fiber and then into a spectral analyzer. The detector system at the anormal angle of 15° is realized as a multiplexed optical system combining a spectral pick-up channel and an RGB color camera at the same viewing angle. Light multiplexing is realized with a plate beam splitter. The illumination channels comprise broadband visible light sources. The same light sources are shared for the color measurements and for the camera-based texture measurements. This enables the implementation of a simultaneous measurement process where the acquisition of image data and the acquisition of spectral reflectance data are executed in parallel. The instruments can thus quickly and accurately evaluate and verify the color, sparkle, and coarseness characteristics of effect finishes.

As apparent from these examples, instruments for measuring the appearance of an object, such as imaging multi-angle spectrophotometers, may require the multiplexing of light that has been reflected along a given viewing direction into two detection channels: an imaging channel with an image sensor for texture measurements and a reference channel with a reference sensor for reference measurements, e.g., spectral measurements. In the prior art, plate or cube beam splitters have been used for multiplexing. Further optical components are required to image the sample surface to the measurement plane of the image sensor and to direct light to the reference detector. These optical components normally include lenses and aperture stops. Precision optical mounts are required to accurately position the beam splitter, the lenses and the aperture stops relative to one another. This leads to a highly complex mechanical setup and high manufacturing costs.

SUMMARY OF THE INVENTION

It is an object of the present invention to realize an optical system that multiplexes incoming light onto an image sensor and a reference sensor, the optical system having reduced complexity and low cost.

This object is achieved by an optical system according to claim 1. Advantageous embodiments are laid down in the dependent claims.

The present invention provides an optical system comprising:

an image sensor, preferably a color image sensor, the image sensor defining an image sensor plane, the optical system being configured to image a measurement plane onto the image sensor plane, the optical system defining an optical axis between the measurement plane and the image sensor plane;

a reference sensor, in particular, a spectrally resolving reference sensor; and an optical multiplexer configured to receive incoming light that impinges on the optical multiplexer along the optical axis and to direct a first portion of the incoming light to the image sensor and to direct a second portion of the incoming light to the reference sensor, wherein the optical multiplexer defines a first area for receiving the first portion of the incoming light and a second area for receiving the second portion of the incoming light, the second area radially surrounding the first area in a projection onto a plane that is perpendicular to the optical axis, and wherein the optical multiplexer is arranged in the optical system in such a manner that the multiplexer directs the first portion of the incoming light, which impinges on the first area, to the image sensor and the second portion of the incoming light, which impinges on the second area, to the reference sensor.

According to the present invention, an optical multiplexer is used which multiplexes light to different destinations depending on the radial position where the light impinges on the multiplexer. In particular, the optical multiplexer defines two different areas for receiving incoming light. When viewed along the optical axis, looking in the direction in which the incoming light impinges on the optical multiplexer, the first area is radially surrounded by the second area, preferably along the entire perimeter of the first area. As a result, the second area has larger radial dimensions perpendicular to the optical axis than the first area. In particular, the first area may appear approximately circular when viewed along the optical axis (i.e., its projection onto a plane perpendicular to the optical axis is circular), and the second area may appear ring-shaped when viewed in this direction, the ring surrounding the first area. The first area, which is comparatively small, is used for directing a first portion of incoming light to the image sensor, while the second area, which is larger, is used for directing a second portion of the incoming light to the reference sensor. Preferably the centroids of the first and second areas conincide.

The optical system will generally define aperture stops for the beam paths to the image sensor and to the reference sensor. The term "aperture stop" refers to the primary structure in the beam path that laterally delimits the bundle of rays that is passed to the respective sensor, determining the ray cone angle and brightness at the image point. In advantageous embodiments, the aperture stop for the beam path to the image sensor is formed by the first area of the optical multiplexer, and/or the aperture stop for the beam path to the reference sensor is formed by the second area of the optical multiplexer. In this manner, separate elements for forming the aperture stops, such as separate diaphragms, can be omitted. This considerably simplifies construction and adjustment of the optical system.

Because the first area of the optical multiplexer is smaller than its second area, the numerical aperture for the beam path to the image sensor will generally be smaller than the numerical aperture for the beam path to the reference sensor. This ensures a large depth of field for the image sensor. The larger numerical aperture for the beam path to the reference sensor ensures high intensity at the reference sensor.

In practice, the dimensions of the first area are often determined by other specifications of the optical imaging system. In particular, standards for multi-angle color measurement typically define the half-angle in object space to a value in the range of 2.5° (see, e.g., DIN 6175-2:2001), thus limiting the numerical aperture of the beam path to the reference sensor and image sensor. Geometrical constraints define the maximum focal length and the maximum magnification of the optical system. This eventually gives an upper bound for the dimensions of the first area if the first area is to form the aperture stop. However, as explained above, it is advantageous to select the size of the first area somewhat smaller than this upper bound in order to achieve sufficient depth of field in the measurement plane over which the acquired image remains sharp. On the other hand, depth of field will often not be an issue for the reference sensor, and therefore the dimensions of the second area may larger than the dimensions of the first area. The resulting difference in aperture angles between the two optical channels allows multiplexing based on position.

In practice, the first area will preferably have a maximum lateral dimension, measured perpendicular to the optical axis, in the range of 0.1 mm to 10 mm, more preferably 0.5 mm to 5 mm. The maximum lateral dimension of the second area, while necessarily being larger than the maximum lateral dimensions of the first area, may be in a similar range.

The optical system may comprise at least one focal optical element for imaging the measurement plane onto the image sensor plane. The focal optical element may comprise, e.g., a single converging lens, a group of two or more lenses, a concave mirror, or a combination of one or more lenses with one or more mirrors and/or other elements such as one or more filters or prisms. At least one such focal optical element may be arranged in the beam path between the measurement plane and the optical multiplexer. Alternatively or additionally, at least one such focal optical element may be arranged in the beam path between the optical multiplexer and the image sensor plane. The focal axis of the focal optical element may define the optical axis.

In preferred embodiments, the optical system is essentially object-space telecentric with respect to the beam path between the measurement plane and the imaging plane. In this manner it can be ensured that image magnification is independent of the distance of the imaged object from the optical element. This may be particularly important if the optical axis does not coincide with the surface normal of the object to be imaged or if the object has a curved surface. The chief rays of a perfect telecentric beam path would be parallel to the optical axis, i.e., they would have an angle of 0° to the optical axis where the chief rays cross the measurement plane. For the purposes of the present disclosure, the system is considered "essentially object-space telecentric" if all chief rays are inclined to the optical axis by not more than 5°, preferably not more than 2.5°, where the chief rays cross the measurement plane.

In order to render the optical system object-space telecentric, preferably a focal optical element is arranged between the measurement plane and the optical multiplexer, and the back focal point (also known as the rear focal point) of the optical element, i.e., the focal point that is located between the optical element and the image sensor, essentially coincides with the position where the optical axis intersects the first area of the optical multiplexer. The back focal point is considered to "essentially coincide" with the first area if the resulting optical system is "essentially object-space telecentric" in the sense defined above. This means that the back focal point may in fact have a distance from the first area within a certain tolerance range. The allowable tolerance range which still ensures that the optical system is "essentially object-space telecentric" depends on several factors, including focal length and numerical aperture, and therefore cannot be easily expressed by absolute numbers.

In advantageous embodiments, the optical multiplexer is a pinhole mirror comprising a mirror surface and a pinhole aperture in the mirror surface, the mirror surface surrounding the pinhole aperture, the pinhole aperture forming the first area of the optical multiplexer, the image sensor being arranged to receive light that has been transmitted through the pinhole aperture, and the mirror surface forming the second area of the optical multiplexer, the reference sensor being arranged to receive light that has been reflected by the mirror surface.

In other words, a pinhole mirror may be used for multiplexing incoming light to an imaging channel and a reference channel. The pinhole aperture transmits the first portion of the incoming light to the image sensor, and the mirror surface reflects the second portion of the incoming light to the reference sensor. A pinhole mirror can be produced in various shapes at very low cost, e.g., by mirror-coating an injection-molded plastics part. In particular, a pinhole mirror can readily be shaped in a manner that facilitates alignment with other components of the optical system, in particular, the image sensor, the reference sensor and, where applicable, the one or more focal optical elements.

In the context of the present invention, the term "pinhole mirror" is to be understood to relate to any mirror that has an aperture in its mirror surface, the aperture being bounded by the mirror surface along the entire perimeter of the aperture, the aperture allowing light to be transmitted through the mirror. Accordingly, the term "pinhole aperture" is to be understood to relate to any aperture in a mirror surface that is bounded by the mirror surface along the entire perimeter of the aperture, regardless of its shape and size. For considerations that may guide the choice of the size of the pinhole aperture, see the discussion of the size of the first area above.

In preferred embodiments, the mirror surface defines a surface normal that is oriented at an oblique angle to the optical axis. The oblique angle is preferably in the range of 135° to 165°. This ensures that light impinging on the mirror surface is reflected away from the optical axis in a direction where it can be readily detected.

In order to ensure cylindrical symmetry for rays that pass through the pinhole aperture, it is advantageous if the pinhole aperture has circular shape if viewed along the optical axis, i.e., in a projection onto a plane perpendicular to the optical axis. This is particularly useful if the pinhole aperture forms the aperture stop for the beam path to the image sensor. If the mirror surface in which the pinhole aperture is formed is oriented at an oblique angle to the optical axis, the preferred shape of the pinhole aperture in the plane of the mirror surface, i.e., when viewed along the mirror normal, is elliptical.

In some embodiments, the mirror surface is planar. In other embodiments, the mirror surface may be curved. In particular, the mirror surface may be concave so as to focus the second portion of the incoming light onto the reference detector.

In a second aspect, the present invention relates to a pinhole mirror that is suitable to be used in an optical system as defined above, the pinhole mirror comprising:

a mounting section for connecting the pinhole mirror to a carrier structure of the optical system;

a mirror substrate section on which a mirror surface with a pinhole aperture is formed; and an intermediate section connecting the mounting section and the mirror substrate section, the intermediate section having a hollow frustoconical shape, tapering both externally and internally from the mounting section towards the mirror substrate section and defining a cone axis, wherein the mirror surface has a surface normal that is oriented at an oblique angle to the cone axis, preferably in the range of 15° to 45°.

When used in the optical system of the present invention, the cone axis advantageously coincides with the optical axis of the optical system.

The proposed design of the pinhole mirror has at least the following advantages: The inside of the hollow intermediate section widens from the mirror substrate section to the mounting section, thus accommodating a range of cone angles of the ray bundle that has passed through the pinhole opening. The frustoconical outside of the intermediate section ensures that rays hitting the intermediate section outside the outer perimeter of the mirror surface will be reflected away from the optical axis. Advantageously, the outside of the intermediate section is glossy and black in order to minimize undesired diffuse scattering of light at the outside of the intermediate section. The frustoconical inside of the intermediate section may have a rough surface structure that renders the inside surface matte (non-glossy). The presence of a mounting section at the base of the frustoconical intermediate section simplifies the connection of the pinhole mirror in the carrier structure.

Advantageously, the pinhole mirror comprises:

a base body made of a plastics material; and a reflective coating disposed on the base body, the reflective coating forming the mirror surface.

In particular, the base body may form the mounting section, the intermediate section and the mirror substrate section, and the reflective coating is applied to the mirror substrate surface only.

In this manner, manufacture of the pinhole mirror can become very cost-efficient. For instance, the base body may be injection-molded, and the reflective coating may subsequently be applied to the mirror substrate section by standard deposition techniques such as plasma ion-assisted deposition or plasma-enhanced chemical vapor deposition.

The pinhole aperture advantageously extends completely through the mirror substrate section of the base body. This is of course required if the base body is made of an opaque material. However, this is also advantageous if the base body is transparent because in this way any image distortion by the base body can be avoided, ensuring the highest possible image quality.

The mounting section may comprise a mounting flange that extends radially away from the cone axis. The mounting flange may form at least one mounting surface that is planar and extends perpendicular to the cone axis, thus simplifying alignment of the pinhole mirror with the optical axis of the optical system. In addition or in the alternative, the mounting section may comprise at least one positioning structure for positioning the pinhole mirror in a carrier structure in a predefined orientation about the cone axis. The positioning structure may comprise, e.g., a cutout formed in the mounting flange or a web formed on the mounting flange.

Instead of taking the form of a pinhole mirror, the optical multiplexer may achieve position-dependent multiplexing also in other manners. In particular, the optical multiplexer may comprise a mirror surface that is surrounded by an annular aperture. The mirror surface may then define the first area of the optical multiplexer, the image sensor being arranged to receive light that has been reflected from the mirror surface, and the annular aperture may define the second area of the optical multiplexer, the reference sensor being arranged to receive light that has been transmitted by the annular aperture. This multiplexer design can be considered an "inverse pinhole mirror", the roles of the aperture and the mirror surface being interchanged while the multiplexer still offers similar advantages as a pinhole mirror.

In a third aspect, the present invention provides a measurement device for determining optical properties of a sample surface, the measurement device comprising:

at least one light source configured to illuminate a measurement spot on the sample surface along at least one illumination direction; and an optical system as defined above, the optical axis of the optical system being oriented along an observation direction, the optical system being arranged to receive, as its incoming light, light that has been reflected from the measurement spot into the observation direction.

In particular, the measurement device may comprise a plurality of light sources arranged to illuminate the measurement spot from a plurality of different illumination directions. The reference sensor may be a spectrally resolving sensor. In particular, the measurement device may be an instrument for measuring the appearance of an object, more specifically, an imaging multi-angle spectrophotometer.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

FIG. 6 shows, in a highly schematic perspective view, an embodiment of the optical system of the first detector channel of the multi-angle spectrophotometer of FIG. 1 in accordance with the present invention, light being multiplexed by a pinhole mirror according to a second embodiment;

FIG. 7 shows, in a perspective view, the second embodiment of the pinhole mirror;

FIG. 8 shows the second embodiment of the pinhole mirror in a schematic longitudinal section;

FIG. 9 shows a process for manufacturing a pinhole mirror according to the second embodiment; and FIG. 10 shows an optical multiplexer according to an alternative embodiment.

DESCRIPTION OF PREFERRED EMBODIMENTS

Definitions

A "spectrophotometer" is a device for determining the spectral response of an object under illumination with visible light. Different types of spectrophotometers are known, having different geometries and being optimized for different purposes. One important type of spectrophotometers, called "goniospectrophotometers" or "multi-angle spectrophotometers", are capable of determining spectral information for a plurality of combinations of different illumination and observation directions. A spectrophotometer can additionally have imaging capabilities, i.e., it can comprise one or more cameras to take one or more digital images of an object. Examples of multi-angle spectrophotometers with imaging capabilities include the aforementioned handheld models MA-T6 or MA-T12 available from X-Rite.

Imaging Multi-Angle Spectrophotometer

Figure 1:
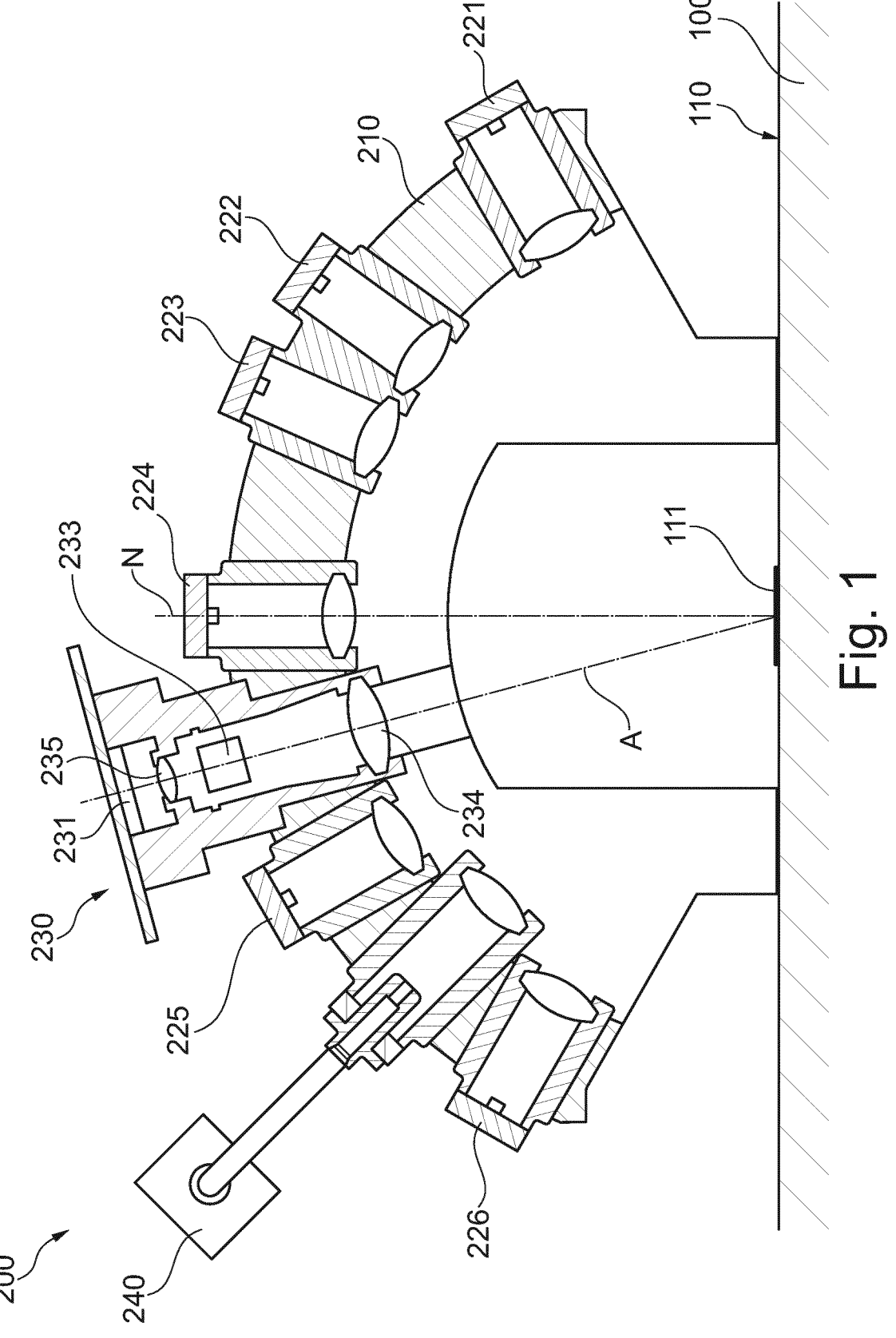
FIG. 1 shows, in a schematic central longitudinal section, components of a multi-angle spectrophotometer with imaging capabilities according to an embodiment of the present invention.

FIG. 1 illustrates an exemplary embodiment of a multi-angle spectrophotometer 200 with imaging capabilities for determining appearance-related properties of a sample object 100. The sample object has a sample surface, which in the present example is planar, defining a measurement plane 110. An arc-shaped carrier body 210 carries a plurality of directional illumination systems, in the present example, six directional illumination systems 221, 222, 223, 224, 225, and 226. The illumination systems are arranged in a common plane, called the device plane, at the following standardized anormal illumination angles relative to the surface normal N to the measurement plane 110: −60°, −30°, −20°, 0°, 30°, and 65°. Each illumination system comprises at least one broadband light source (e.g., one or more LEDs) and a converging lens for collimating the light from the light source to form a collimated illumination light beam. The illumination light beams illuminate a common measurement spot 111 on the sample surface. Two detector systems 230, 240 at standardized anormal viewing angles of 15° and 45° pick up light that has been reflected from the measurement spot 111. The first detector system 230, at the viewing angle of 15°, is a multiplexed optical system with both spatial and spectral resolution, comprising both an RGB image sensor and a spectrally resolving reference sensor (sometimes also called a "side sensor"). This detector system will be described in more detail below. The second detector system 240, at the viewing angle of 45°, is a spectrally resolving detector system without spatial resolution. Further components may be also present, but are not illustrated in FIG. 1, for instance further illuminators for diffuse illumination or a housing.

Optical System with Cube Beam Splitter

Figure 2:
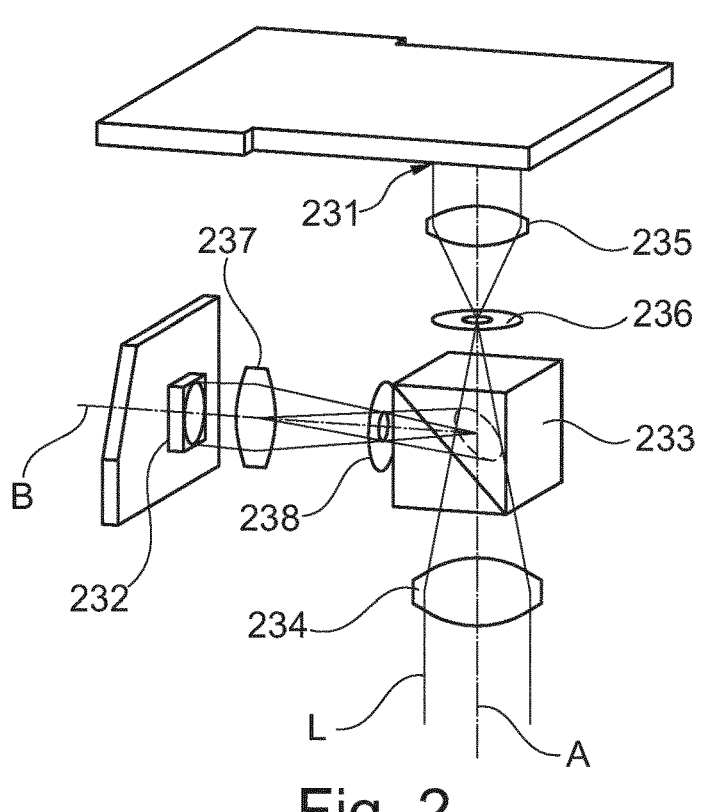
FIG. 2 shows, in a highly schematic perspective view, an embodiment of the optical system of the first detector channel of the multi-angle spectrophotometer of FIG. 1 that is not in accordance with the present invention, light being multiplexed by a traditional cube beam splitter.

FIG. 2 illustrates an embodiment of an optical system that can be used as the first detector system 230, this embodiment not being in accordance with the present invention. The optical system comprises an RGB image sensor 231, e.g., a color CCD or CMOS image sensor as it is well known in the art. The optical system further comprises a spectrally resolving reference sensor 232, e.g., a spectrometer using an optically dispersive element like a prism or grating, or a spectrally resolving color sensor that uses a plurality of narrow-band optical bandpass filters. A first focal optical element 234, defining an optical axis A, focuses an incoming light beam L to a first aperture stop element 236, thus rendering the optical system object-space telecentric. A second focal optical element 235 arranged on the optical axis images the light from the object that has passed through the aperture stop element 236 onto the image sensor 231. A cube beam splitter 233 is arranged in the beam path between the first optical element 234 and the aperture stop element 236. The cube beam splitter 233 acts as an optical multiplexer, reflecting some of the light that is incident on the cube beam splitter 233 along a direction B away from the optical axis A and onto the reference sensor 232. On its way to the reference sensor 232, the reflected light is passed through a second aperture stop element 238 and through a third focal optical element 237, which focuses the reflected light onto the reference detector 232. In the present example, all focal optical elements are embodied as single converging lenses; however, each of these elements may as well be embodied as a group of lenses or any other type of focal element, as it is well known in the art.

The setup of FIG. 2 requires a large number of elements to be precisely aligned. In particular, the beam splitter 233 needs to be precisely oriented relative to the optical axis A; the first aperture stop element 236 needs to be radially aligned with the optical axis A, and it needs to be axially positioned at the back focus of the first optical element 234; and the second aperture stop element 237 needs to be radially and axially aligned relative to the direction B. For achieving the required alignment, precision mounts are needed, causing high complexity of the mechanical setup and accordingly high manufacturing costs.

Optical System with Pinhole Mirror

Figure 3:
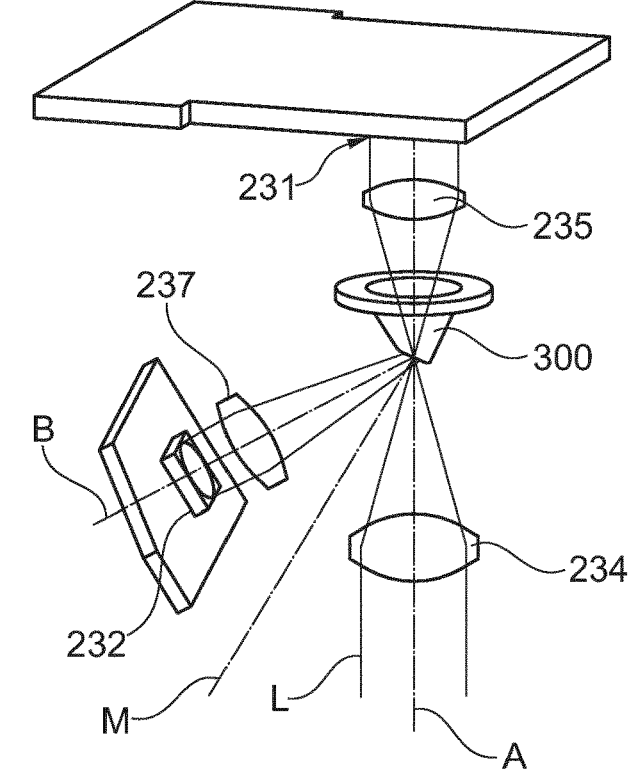
FIG. 3 shows, in a highly schematic perspective view, an embodiment of the optical system of the first detector channel of the multi-angle spectrophotometer of FIG. 1 in accordance with the present invention, light being multiplexed by a pinhole mirror according to a first embodiment.
Figure 4:
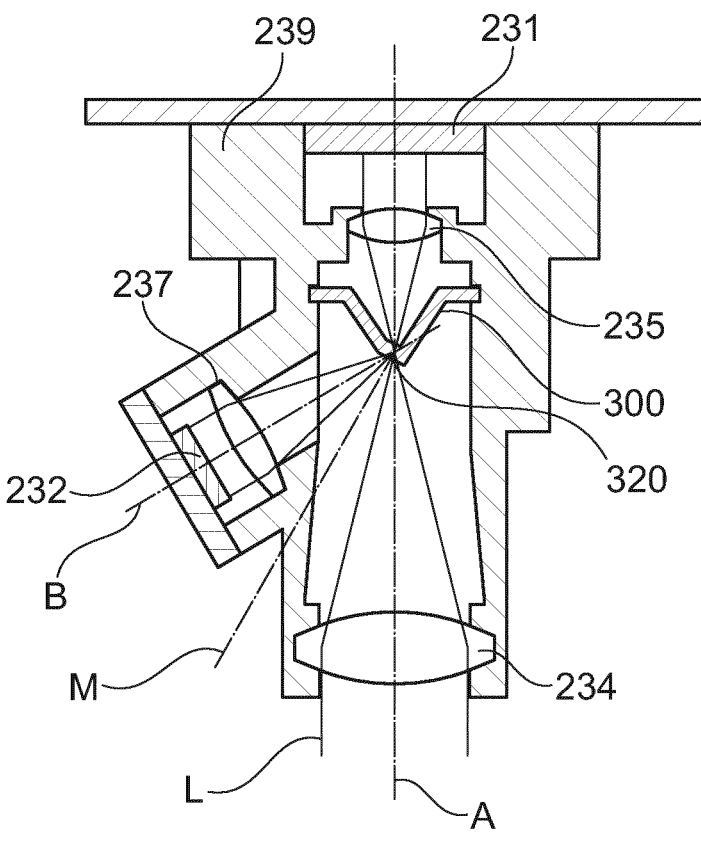
FIG. 4 shows the optical system of FIG. 3 in a central longitudinal section, together with additional components.
Figure 5:
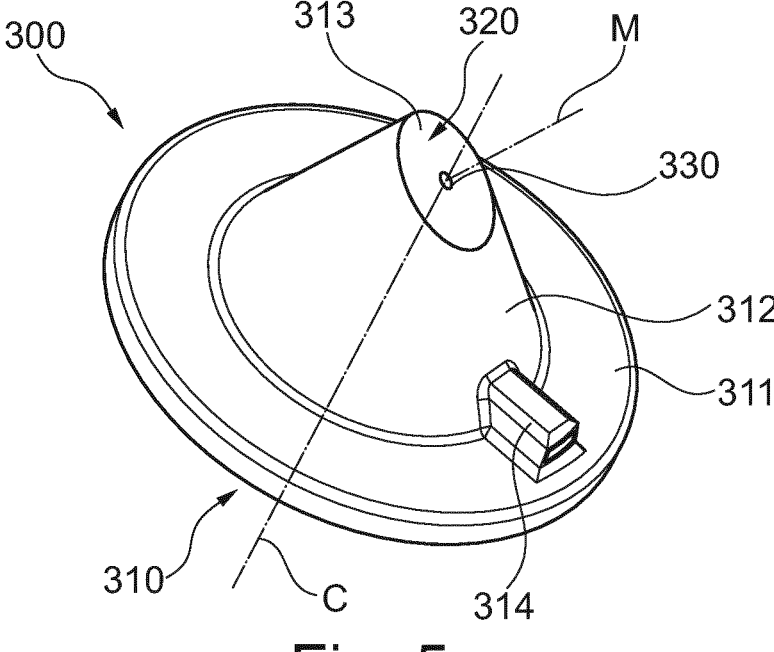
FIG. 5 shows, in a perspective view, the first embodiment of the pinhole mirror.

FIG. 3 illustrates an embodiment of an optical system that may be used as the first detector system 230, this embodiment being in accordance with the present invention. In this embodiment, instead of a beam splitter, a pinhole mirror 300 is used for multiplexing the incoming light toward the image sensor 231 and the reference sensor 232. FIG. 4 shows this embodiment of the optical system with a carrier structure 239 to which the individual optical components are connected. FIG. 5 shows the pinhole mirror 300 by itself.

The pinhole mirror 300 of this embodiment is a single, one-piece mechanical part. It comprises a base body 310 made of plastics and a mirror coating 321 on the base body, the mirror coating 321 forming a mirror surface 320. The base body is preferably black, has a smooth glossy exterior surface and a rough matte interior surface. The mirror coating preferably has low polarization dependence.

The base body 310 comprises three sections: a mounting section 311 for connecting the pinhole mirror 300 to the carrier structure 239, a mirror substrate section 313 on which the mirror coating 321 is disposed, and a hollow intermediate section 312 that connects the mounting section 311 and the mirror substrate section 313. A pinhole aperture 330 is formed in the mirror coating 321, the pinhole aperture 330 extending all the way through the mirror substrate section 313 to the hollow interior of the intermediate section 313. The pinhole aperture 330 allows a first portion of the light that is incident on the pinhole mirror 300 to pass through the pinhole mirror 300. The mirror substrate section 313 with the mirror coating 321 is tilted relative to the cone axis C, defining a surface normal M at an oblique angle to the cone axis. In the present example, this angle is 30°. Thereby, the mirror surface 320 reflects a second portion of the incident light away from the optical axis A into a direction B, which runs at an angle of 180°−2·30°=120° relative to the optical axis A.

The intermediate section 312 has a hollow frustroconical shape, continuously widening from the mirror substrate section 313 to the mounting section 311 both at its inside and its outside. The intermediate section 312 defines a cone axis C, which coincides with the optical axis A. Thereby a cone of rays that has passed through the pinhole aperture can propagate unhindered inside the hollow intermediate section 312.

The mounting section 311 forms a mounting flange that extends radially away from the cone axis C. The mounting flange forms a circumferential mounting surface that is planar and extends perpendicular to the cone axis C. In particular, the ring-shaped surface on the side of the mounting flange from which the intermediate section 312 extends away (i.e., the surface that is visible in FIG. 5) may serve as the mounting surface. Using the mounting flange, the pinhole mirror 300 can be readily connected to the carrier structure 329 such that the cone axis C is precisely aligned with the optical axis A, and it can be precisely positioned along the optical axis A relative to the focal optical elements 234, 235. To ensure high precision of the axial position of the pinhole mirror 300, the mounting surface should be smooth and glossy. The perimeter of the mounting section may be used for radial positioning. Accordingly, at least a portion of the perimeter is advantageously also smooth and glossy. A positioning structure 314 in the form of a radial web additionally ensures that the pinhole mirror 300 is mounted in the correct orientation about the optical axis A such that the reflected portion of the incoming light hits the reference detector 232. Of course, the mounting section 311 may have a different shape than in FIG. 5. For instance, the mounting section may have a polygonal outline, e.g., a rectangular outline, in particular, a square outline, instead of the circular outline shown in FIG. 5. If the outline is polygonal, the corners of the polygon may be rounded. A different type of positioning structure may be provided instead of a radial web. For instance, a radial or tangential cutout may be provided in the mounting section, in particular, at its perimeter to ensure that the pinhole mirror 300 can be mounted only in a predefined orientation about the optical axis A. More particularly, if the outline of the mounting section is rectangular, in particular, square, the positioning structure may be formed by a diagonal cutout at one of the four corners of the rectangle.

In contrast to a traditional beam splitter, the pinhole mirror 300 acts as an optical multiplexer that multiplexes the incoming light depending on the position where the light hits the multiplexer: Light that hits a first area of the pinhole mirror (the center of the mirror surface 320 where the pinhole aperture is arranged) is transmitted through the central pinhole aperture 330, while light that hits a second area of the pinhole mirror (the mirror surface that surrounds the pinhole aperture) is reflected away from the optical axis.

In addition to acting as a multiplexer, the pinhole mirror 300 also forms the aperture stops for the beam paths of the image sensor 231 and of the reference sensor 232, i.e., the pinhole mirror laterally delimits the bundles of rays that are passed to these sensors, determining the ray cone angles and the brightness in the sensor planes. In particular, the pinhole aperture 330 directly forms the aperture stop for the beam path to the image sensor, and the mirror surface 320, at its outer perimeter, directly forms the aperture stop for the beam path to the reference detector. In the present example, the aperture stops are concentrical, i.e., their centroids coincide. Since both aperture stops are realized in the same optical surface of the same mechanical part, they can be manufactured with high mechanical precision and are automatically aligned with respect to each other.

Since the pinhole aperture 330 and the mirror surface 320 directly form aperture stops, these beam-limiting elements advantageously have circular shape when viewed along the cone axis A, i.e., in a projection onto a plane that is perpendicular to the cone axis A, and hence if they have elliptical shape in the plane of the mirror surface, i.e., when viewed along the surface normal M of the mirror surface.

The pinhole aperture 330 has necessarily a smaller diameter than the mirror surface 320. This causes a relatively small numerical aperture for the image sensor 231. While on first sight this might seem disadvantageous, in fact a small numerical aperture is desired since it ensures a sufficient depth of field to achieve good image quality even if the optical axis A does not coincide with the surface normal N of the sample object 100, as in the embodiment of FIG. 1, or if the surface of the object 100 is curved.

The first focal optical element 234 focuses the incoming light beam L to the center of the pinhole aperture 330, thus rendering the optical system object-space telecentric.

The base body 310 of the pinhole mirror 300 can be manufactured with high mechanical precision by injection molding, enabling very low manufacturing costs. The mirror coating 321 can be applied by any known coating process.

Alternative Embodiment of Pinhole Mirror

FIGS. 6 to 8 illustrate a second embodiment of a pinhole mirror. The pinhole mirror 400 of this embodiment comprises a transparent base body 410 made of glass or another transparent medium in the shape of a cuboid or, more generally speaking, of a disk. A black absorptive coating 411 is applied to the front side of the base body 410. A mirror coating 421 forming a mirror surface 420 is applied onto a central portion of the black coating. A pinhole aperture 430 is formed in both these coatings. An optional broad-band anti-reflective coating 412 is applied to the back side of the base body 410.

The black absorptive coating 411 and the anti-reflective coating 412 are applied to reduce internal reflections from the back side of the base body 410.

In contrast to the pinhole mirror 300 of previously described embodiment, the pinhole mirror 400 of the second embodiment needs to be held in a mechanical holder.

FIG. 9 illustrates a method of manufacture of the pinhole mirror of the second embodiment. In step (a), the front side of the base body 410 is coated with a photoresist 413. In step (b), the photoresist is photolithographically structured to define the central pinhole area 414. In step (c), a black absorptive coating is applied onto the entire front side of the base body 410. A photoresist is applied onto the black coating and is photolithographically structured to define the outer limit of the area where the mirror coating is to be applied. The mirror coating is then applied. In step (d), the photoresist masks are removed, leaving the desired coating structure on the front side.

Alternative Optical Multiplexer

FIG. 10 illustrates an optical multiplexer 400' according to an alternative embodiment. This embodiment may conceptually be considered an "inverse pinhole mirror". Like the pinhole mirror of FIG. 8, the optical multiplexer of FIG. 10 comprises a transparent base body 410 made of glass in the shape of a cuboid. A black absorptive coating 411 is applied to a portion of the front side of the base body 410, leaving a circular region on the front side uncoated. A mirror coating 441 forming a mirror surface 440 is applied to the center of the uncoated circular region. As a result, an annular aperture 450 surrounds the mirror surface 440. As in the embodiment of FIG. 8, an optional broad-band anti-reflective coating 412 is applied to the back side of the base body 410. This embodiment of an optical multiplexer may be manufactured in a very similar manner as the pinhole mirror or FIG. 8.

In this embodiment, the mirror surface 440 is employed to reflect incoming light to the image sensor, while the annular aperture 450 is employed to transmit incoming light to the reference sensor. Accordingly, in the setup of FIG. 6, the roles of the image sensor and the reference sensor would be exchanged, i.e., sensor 232 in FIG. 6 would be an image sensor and sensor 231 would act as the reference sensor if the optical multiplexer 400' is used.

The same concept may also be implemented using a design similar to the design of the pinhole mirror of FIG. 5, which uses an opaque base body. In such a design, the central mirror surface 440 would be suspended in the annular aperture by thin bridges.

Modifications

It is to be understood that the invention is not limited to the above-discussed embodiments, and that various modifications are possible without leaving the scope of the present invention. In particular, the illumination systems 221-226 may be constructed differently, and a different number of illumination systems may be provided. Likewise, the number and type of detector systems may be different. For instance, the second detector system 240 may also comprise an image sensor in addition to a spectrally resolving sensor. The image sensor and the spectral sensor of the second detector system 240 could be multiplexed with a conventional beam splitter or with an optical multiplexer according to the invention. While the reference sensor 232 is preferably a spectrally resolving sensor, it might also be another type of sensor. Many other modifications are possible.

LIST OF REFERENCE SIGNS

| | |
|---|---|
| 100 | Sample object |
| 110 | Measurement plane |
| 111 | Measurement spot |
| 200 | Measurement device |
| 210 | Arc body |
| 221-226 | Light source |
| 230 | Detector system |
| 231 | Image sensor |
| 232 | Reference sensor |
| 233 | Multiplexer |
| 234 | Entrance lens |
| 235 | Exit lens |
| 236 | Aperture stop |
| 237 | Exit lens |
| 238 | Aperture stop |
| 239 | Carrier structure |
| 240 | Detector system |
| 300 | Pinhole mirror |
| 310 | Base body |
| 311 | Mounting section |
| 312 | Intermediate section |
| 313 | Mirror substrate section |
| 314 | Positioning structure |
| 320 | Mirror surface |
| 321 | Reflective coating |
| 330 | Pinhole aperture |
| 400 | Pinhole mirror |
| 400' | Alternative multiplexer |
| 410 | Base body |
| 411 | Black coating |
| 412 | Anti-reflection coating |
| 420 | Mirror surface |
| 421 | Reflective coating |
| 430 | Pinhole aperture |
| 440 | Mirror surface |
| 450 | Annular aperture |
| A | Optical axis |
| B | Axis of reflection |
| C | Cone axis |
| N, M | Surface normal |

The invention claimed is:

1. An optical system comprising:

a spatially resolving image sensor, the image sensor defining an image sensor plane, the optical system being configured to image a measurement plane onto the image sensor plane, the optical system defining an optical axis (A) between the measurement plane and the image sensor plane;

a reference sensor; and an optical multiplexer configured to receive incoming light along the optical axis (A) and to direct a first portion of the incoming light to the image sensor and a second portion of the incoming light to the reference sensor, wherein the optical multiplexer defines a first area for receiving the first portion of the incoming light and a second area for receiving the second portion of the incoming light, the second area radially surrounding the first area when viewed along the optical axis and projected onto a plane that is perpendicular to the optical axis (A), and wherein the optical multiplexer is arranged in the optical system in such a manner that the optical multiplexer directs the first portion of the incoming light, which impinges on the first area, to the image sensor and the second portion of the incoming light, which impinges on the second area, to the reference sensor.

2. The optical system of claim 1, wherein the first area of the optical multiplexer has dimensions such that a ray cone angle and a brightness of the first portion of the incoming light at an image point of the image sensor are determined by the dimensions of the first area of the optical multiplexer.

3. The optical system of claim 1, wherein the second area of the optical multiplexer has dimensions such that a ray cone angle and a brightness of the second portion of the incoming light at an image point of the reference sensor are determined by the dimensions of the first area of the optical multiplexer.

4. The optical system of claim 1, comprising at least one focal optical element for imaging the measurement plane onto the image sensor plane, wherein preferably the at least one focal optical element renders the optical system object-space telecentric with respect to the beam path between the measurement plane and the imaging plane, chief rays being inclined to the optical axis (A) by not more than 5° where the chief rays cross the measurement plane.

5. The optical system of claim 1, wherein the optical multiplexer is a pinhole mirror comprising a mirror surface and a pinhole aperture in the mirror surface, the mirror surface surrounding the pinhole aperture, the pinhole aperture forming the first area of the optical multiplexer, the image sensor being arranged to receive light that has been transmitted through the pinhole aperture, and the mirror surface forming the second area of the optical multiplexer, the reference sensor being arranged to receive light that has been reflected by the mirror surface.

6. The optical system of claim 5, wherein the mirror surface defines a surface normal that is oriented at an oblique angle to the optical axis (A).

7. The optical system of claim 1, wherein the pinhole mirror comprises:

a mounting section for connecting the pinhole mirror to a carrier structure of the optical system;

a mirror substrate section on which the mirror surface is formed; and an intermediate section that connects the mounting section and the mirror substrate section, the intermediate section having a hollow frustroconical shape, tapering both externally and internally from the mounting section toward the mirror substrate section and defining a cone axis (C), the cone axis (C) coinciding with the optical axis (A).

8. The optical system of claim 1 any one of claim 1, wherein the optical multiplexer comprises a mirror surface that is surrounded by an annular aperture, the mirror surface defining the first area of the optical multiplexer, the image sensor being arranged to receive light that has been reflected from the mirror surface, and the annular aperture defining the second area of the optical multiplexer, the reference sensor being arranged to receive light that has been transmitted by the annular aperture.

9. A pinhole mirror for use in an optical system according to claim 1, the pinhole mirror comprising:

a mounting section for connecting the pinhole mirror to a carrier structure of the optical system;

a mirror substrate section on which a mirror surface with a pinhole aperture is formed; and an intermediate section connecting the mounting section and the mirror substrate section, the intermediate section having a hollow frustroconical shape, tapering both externally and internally from the mounting section towards the mirror substrate section and defining a cone axis (C), wherein the mirror surface has a surface normal (M) that is oriented at an oblique angle to the cone axis (C).

10. The pinhole mirror of claim 9, comprising:
a base body forming the mounting section, the intermediate section and the mirror substrate section, the base body being made of a plastics material; and
a reflective coating disposed on the mirror substrate section, the reflective coating forming the mirror surface.

11. The pinhole mirror of claim 10, wherein the pinhole aperture fully extends through the mirror substrate section of the base body.

12. The pinhole mirror of claim 9, wherein the pinhole aperture has circular shape when viewed along the cone axis (A) and projected onto a plane that is perpendicular to the cone axis (A).

13. The pinhole mirror of claim 9,
wherein the mounting section comprises a mounting flange that extends radially away from the cone axis (C).

14. A measurement device for determining optical properties of a sample surface, the measurement device comprising:
at least one light source configured to illuminate a measurement spot on the sample surface along at least one illumination direction; and
an optical system comprising:
a spatially resolving image sensor the image sensor defining an image sensor plane, the optical system being configured to image a measurement plane onto the image sensor plane, the optical system defining an optical axis (A) between the measurement plane and the image sensor plane;
a reference sensor; and
an optical multiplexer configured to receive incoming light along the optical axis (A) and to direct a first portion of the incoming light to the image sensor and a second portion of the incoming light to the reference sensor,
wherein the optical multiplexer defines a first area for receiving the first portion of the incoming light and a second area for receiving the second portion of the incoming light, the second area radially surrounding the first area when viewed along the optical axis and projected onto a plane that is perpendicular to the optical axis (A),
wherein the optical multiplexer is arranged in the optical system in such a manner that the optical multiplexer directs the first portion of the incoming light, which impinges on the first area, to the image sensor and the second portion of the incoming light which impinges on the second area, to the reference sensor,
wherein the optical axis of the optical system is oriented along an observation direction, and
wherein the optical system is arranged to receive, as its incoming light (L), light that has been reflected from the measurement spot into the observation direction.

15. The measurement device of claim 14, comprising a plurality of light sources arranged to illuminate the measurement spot from a plurality of different illumination directions.

16. The optical system of claim 6, wherein the oblique angle is in the range of 135° to 165°.

17. The pinhole mirror of claim 9, wherein the mirror surface has an outer perimeter having circular shape when viewed along the cone axis (A) and projected onto a plane that is perpendicular to the cone axis (A).

18. The pinhole mirror of claim 13, wherein the mounting flange forms at least one mounting surface that is planar and extends perpendicular to the cone axis (C).

19. The pinhole mirror of claim 13, wherein the mounting section comprises at least one positioning structure for positioning the pinhole mirror in a carrier structure in a predefined orientation about the cone axis (C), the at least one positioning structure comprising a cutout formed in the mounting flange or a web formed on the mounting flange.

20. The measurement device of claim 14, wherein the reference sensor is a spectrally resolving sensor.

\* \* \* \* \*